United States Patent

Krikorian et al.

[11] Patent Number: 5,959,573
[45] Date of Patent: Sep. 28, 1999

[54] PROCESSING METHOD USING AN ADVANCED WAVEFORM FOR UNLOCKED COHERENT AND WIDEBAND BISTATIC RADAR OPERATION

[75] Inventors: Kapriel V. Krikorian, Agoura; Robert A. Rosen, Agoura Hills, both of Calif.

[73] Assignee: Raytheon Company, Lexington, Mass.

[21] Appl. No.: 09/083,457

[22] Filed: May 22, 1998

[51] Int. Cl.$^6$ .................................................. G01S 13/66
[52] U.S. Cl. ................................ 342/90; 342/195; 342/95
[58] Field of Search ............................ 342/90, 147, 195, 342/196, 97, 95

[56] References Cited

U.S. PATENT DOCUMENTS

| | | | |
|---|---|---|---|
| 3,825,928 | 7/1974 | Williams | 342/158 |
| 4,644,356 | 2/1987 | Yamano | 342/194 |
| 5,115,246 | 5/1992 | Thomas, Jr. et al. | 342/195 |
| 5,736,956 | 4/1998 | Kennedy et al. | 342/90 |

*Primary Examiner*—Ian J. Lobo
*Attorney, Agent, or Firm*—Leonard A. Alkov; Glenn H. Lenzen, Jr.

[57] ABSTRACT

A bistatic coherent unlocked radar system and processing method using an advanced waveform that permits bistatic unlocked coherent operation of an unlocked radar transmitter and receiver. The waveform implements intrapulse fine range resolution, pulse to pulse coherency and burst to burst frequency agility to provide for enhanced target detection and robust operation in electronic countermeasure environments. A continuous sequence of pulses at different frequencies is transmitted that may contain an acquisition frequency that is revisited) more times than the other frequencies. Energy reflected from a target is processed to detect energy at the acquisition frequency, for example, over a plurality of range bins and predetermined pulse repetition intervals. A range pattern is generated if the detected energy is above a predetermined threshold. The energy is centroided to indicate the relative angle to the target. The transmitted frequencies contained in the pattern of energy are identified. The receiver then frequency hops with the transmitter. The energy is coherently processed using Fourier transforms to determine the center in the pattern, which pattern center is indicative of the direction to the target.

10 Claims, 4 Drawing Sheets

PROCESSING METHOD USING AN ADVANCED WAVEFORM FOR UNLOCKED COHERENT AND WIDEBAND BISTATIC RADAR OPERATION

BACKGROUND

The present invention relates generally to radar systems, and more particularly, to a processing method and waveform that provides for bistatic unlocked coherent operation of unlocked transmitters and receivers of bistatic radar systems.

The assignee of the present invention manufactures radar systems for use in target detection and target tracking, and the like. The assignee of the present invention continuously endeavors to improve the performance and expand the applications for its radar systems. To that end, a goal of developmental efforts has been to reduce the complexity and cost of the radar systems.

To accomplish this, the assignee of the present invention has developed bistatic unlocked radar systems that do not require the use of atomic clocks or synchronization pulses to lock a transmitter to a receiver. Elimination of synchronizing components reduces the costs and complexity of radar systems.

An invention disclosed in U.S. Pat. No. 5,736,956, issued Apr. 7, 1998, entitled "Unlocked W-band Receiver with Coherent Features", assigned to the assignee of the present invention, discloses a coherent radar receiver that has pulse-to-pulse coherence using an unlocked voltage controlled oscillator. The waveform and processing method of the present invention is designed to cooperate with this receiver to provide for a bistatic coherent unlocked radar system.

Accordingly, it is an objective of the present invention to provide for a waveform and processing method that permits low cost coherent and frequency agile bistatic operation of unlocked radar transmitters and receivers.

SUMMARY OF THE INVENTION

To accomplish the above and other objectives, the present invention provides for a bistatic coherent unlocked radar system and processing method using an advanced waveform that permits bistatic unlocked coherent operation of an unlocked radar transmitter and receiver. The waveform implements intrapulse fine range resolution, pulse to pulse coherency and burst to burst frequency agility to provide for enhanced target detection and robust operation in electronic countermeasure environments.

Use of the waveform and processing method permits low cost coherent and frequency agile bistatic operation using unlocked radar transmitters and receivers. The invention present allows pulse to pulse waveform versatility, high radar sensitivity, including enhanced detection of low radar cross section targets, and effective operation against jammers.

The waveform and processing method may be advantageously used with currently deployed airborne radar systems, such as those manufactured by the assignee of the present invention. This waveform and processing method permits implementation of low cost airborne bistatic receivers for enhanced target detection and target tracking in high precision weapon systems.

The system, waveform and processing method were flight tested, and test results showed that unlocked coherent bistatic operation was achieved. In addition, the present invention coupled with the invention disclosed in U.S. Pat. No. 5,736,956, issued Apr. 7, 1998, entitled "Unlocked W-band Receiver with Coherent Features", and assigned to the assignee of the present invention, allows implementation of very simple and low cost bistatic receivers that may be used to replace bistatic systems that are locked and/or synchronized using atomic clocks, synchronization pulses, or by other means.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
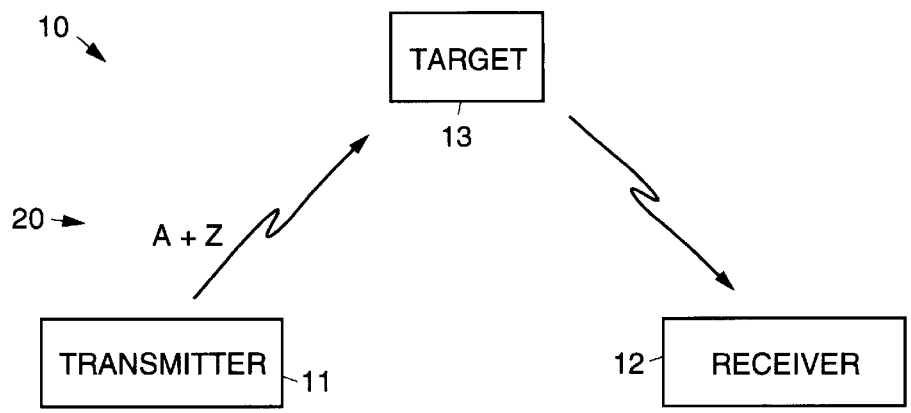
FIG. 1 illustrates an operational environment for a bistatic coherent unlocked radar system in accordance with the principles of the present invention.

Referring to the drawing figures, FIG. 1 illustrates an operational environment for a bistatic coherent unlocked radar system 10 in accordance with an embodiment of the present invention. The bistatic coherent unlocked radar system 10 comprises a transmitter 11 and a receiver 12. The transmitter 11 transmits a waveform 20 in accordance with the principles of the present invention (FIG. 2) that comprises a continuous sequence of pulses at different sets of frequencies. The transmitter 11 transmits sum and difference patterns in the general direction of a target 13. Energy reflected from the target 13 is received by the receiver 12 and processed to determine the direction and range to the target 13. The waveform 20 is transmitted and processed in order to detect the target 13.

It is important to understand that the direct path signal from the transmitter 11 to the receiver 12 is not required. The receiver operates to find the pattern center in the transmitted waveform reflected by the target 13. The pattern center in the received signal is indicative of the center of clutter detected by the receiver 12. Furthermore, the receiver contains no local oscillator or atomic clock that would lock it to the transmitter.

Figure 1A:
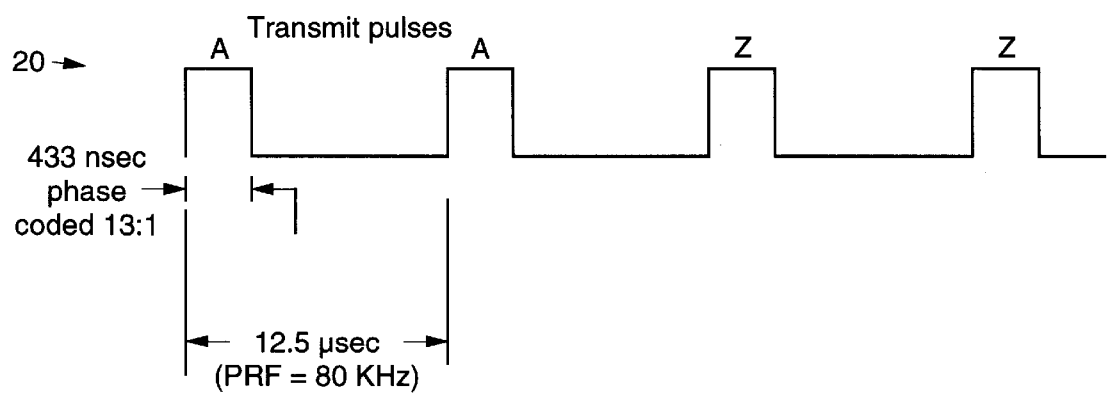
FIG. 1a illustrates an exemplary waveform in accordance with the principles of the present invention and its associated parameters.

FIG. 1a illustrates a typical waveform 20 in accordance with the principles of the present invention along with exemplary parameters thereof that allow bistatic unlocked coherent operation of the unlocked radar transmitter 11 and receiver 11 of the bistatic radar system 10. The following discussion describes a typical exemplary waveform 20 which allows unlocked coherent bistatic operation of the unlocked radar transmitter 11 and receiver 12. The features and the characteristic parameters of this exemplary waveform 20 are as follows.

The exemplary waveform 20 has frequency agility at 20 msec intervals over a tunable bandwidth of about 500 MHz. The exemplary waveform 20 has nine frequency steps separated by at least 50 MHz, and one additional frequency in the receiver 12 which can be used for receiving illumination from a different radar transmitter 11. In a flight test conducted using an embodiment of the bistatic coherent unlocked radar system 10, 9 transmitted radio frequencies were stepped every 20 msec and a return to the acquisition frequency occurred every 80 msec. A transmit sequence such as: AA ZZ AA . . . is employed, where A and Z denote radar pulses transmitted with different antenna patterns. However, it is to be understood that other sequences of pulses may also be transmitted if desired. The exemplary waveform 20 uses intrapulse phase coding to provide for fine range resolution (e.g. five meters), with a 433 nsec pulsewidth with 13:1 pulse compression.

The bistatic unlocked receiver 12 must first acquire a signal (target 13) and then track the signal (target 13). The receiver 12 knows the pulse repetition interval and frequencies transmitted by the transmitter 11 and the acquisition frequency that is revisited by the transmitter 11 to improve acquisition. Real time acquisition includes acquisition of the target 13 or clutter and synchronization of the unlocked receiver 12 with the transmitter 11. The following acquisition functions are performed by the receiver 12.

In achieving real time angle and range acquisition, a beam is placed in the approximate direction of an illumination beam reflected from the target 13. A mini-raster scan, or a conical scan, is used to find the location of the maximum (pattern center) signal. Thus, the receiver 12 looks (scans) in angle in a direction towards the received energy. The receiver 12 stays on a preselected (acquisition) frequency that is revisited by the transmitter 11 more frequently. The receiver 12 forms range bins that accumulate energy over time.

The target 13 (mainlobe clutter) is distinguished from the direct path signal from the transmitter 11. The direct path signal has a shorter range compared to the pattern center of the mainlobe clutter. The center of the clutter signal over beam position is determined. A seeker recognizes the characteristic frequency pattern. Pulse repetition interval (PRI) drift estimation is based on the acquisition radio frequency. PRI drift is estimated using a clutter range tracker. The phase of the transmitted RF agility cycle may also be determined. RF cycling of the receiver 12 (nine frequencies over about 500 MHz) and target confirmation on each RF step is performed.

Figure 2:
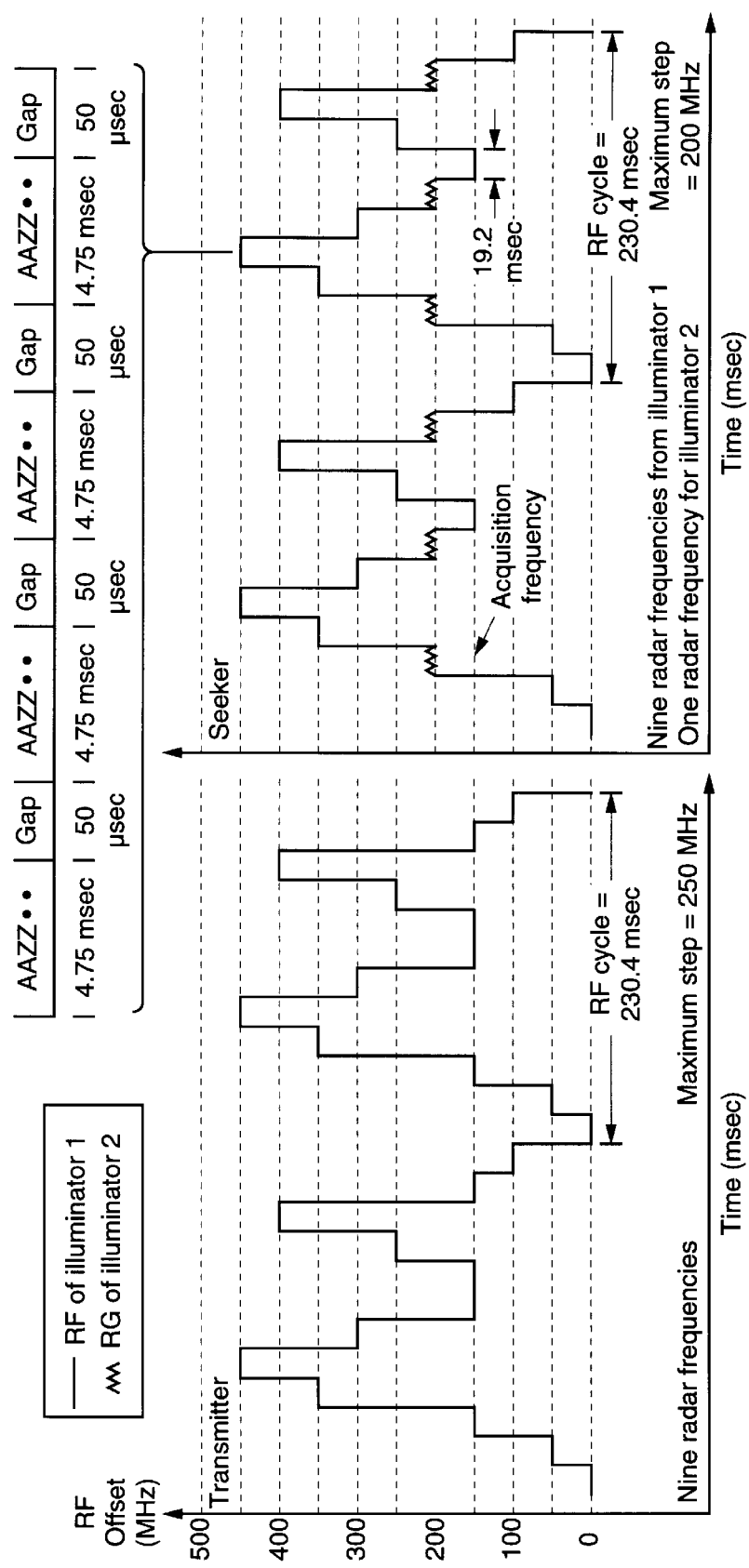
FIG. 2 shows transmit and receive RF sequences using the exemplary waveform of FIG. 1.

FIG. 2 shows the transmit and receive RF sequences. The transmitter 11 has the same sequence as the receiver 12 except during reference time slots. This allows additional time for the receiver 12 in the acquisition phase on the predesignated frequency. Thus, the seeker acquires the target 13 in range and in angle. Once the target 13 is acquired in range and angle, the receiver 12 starts hopping in frequency with the received sequence of signals and becomes locked to the signals transmitted by the transmitter 11.

After the acquisition phase (i.e. in target track), the receiver 12 may process radiation from a different frequency of a different transmitter 11 during the time period allocated for the acquisition frequency. The receiver 12 synchronizes itself to the transmitter 11 to within 0.1 msec (as demonstrated in the flight test).

During each 20 millisecond RF frame, the transmitter 11 inserts a gap between pulses (e.g., every 4.8 msec or 384 pulses) to insure the "A" pulses and the "Z" pulses in the sequence are recognized after successful acquisition and in target track.

The processing includes intrapulse (13:1) range compression and coherent pulse-to-pulse processing. The pulse-to-pulse processing is performed over 0.4 msec arrays and includes: fast Fourier transform (FFT 1) processing of pulses AA00AA00 . . . AA00, fast Fourier transform (FFT 2) processing of pulses 00ZZ00ZZ . . . 00ZZ, detection and tracking of the target 13, and subtracting the phase of the signals from the two FFTs to obtain the Z phase relative to the A phase. This technique recovers the correct relative phase even if there is an unknown offset between receive and transmit oscillators. Thus, FFTs are performed over the A pulses and the Z pluses, and the clutter FFT filter is identified to determine that angular measurement to the pattern center which is indicative of the direction to the target 13. This pattern center processing is generally well known, and may be the processing disclosed in U.S. Pat. No. 5,736,956, issued Apr. 7, 1998, entitled "Unlocked W-Band Receiver with Coherent Features", assigned to the assignee of the present invention, the contents of which are incorporated herein by reference.

FIG. 2 illustrates exemplary frequency sequences with a 25% duty factor on a second transmitter 11 during target signal track. In FIG. 2, the transmitter 11 has the same sequence as the receiver 12 except that during the reference time slots, the transmitter 11 is on the receiver acquisition frequency. This reduces the acquisition time for the receiver 12 while maintaining a preset sequence for the transmitter 11. A 50 μsec gap every 5 msec insures synchronization of the receiver 12 to the A and Z pulses which use different antenna patterns on transmit.

Figure 3:
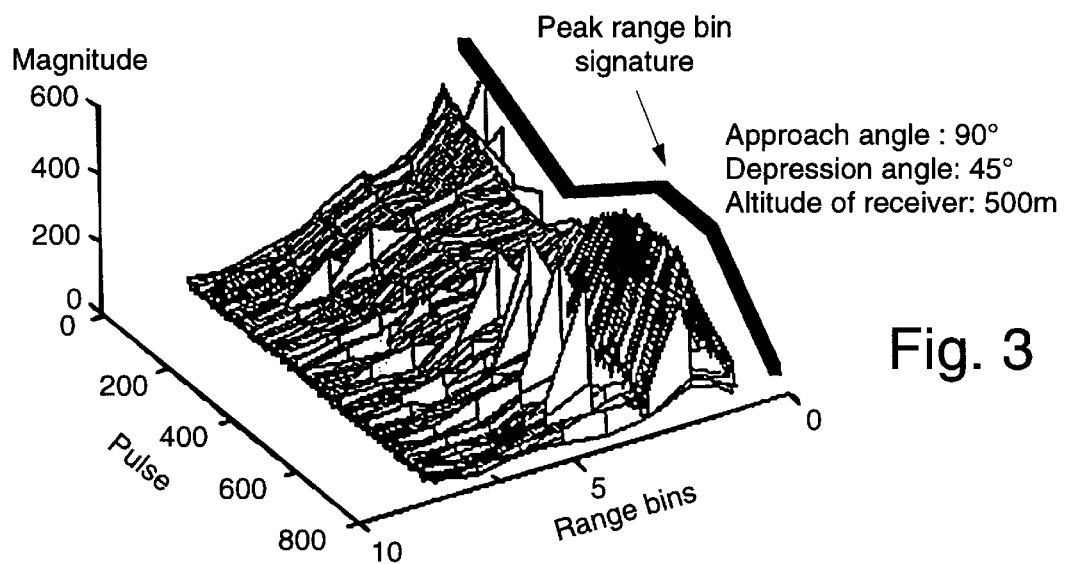
FIG. 3 illustrates exemplary flight test data showing intrapulse biphase pulse compression.
Figure 4:
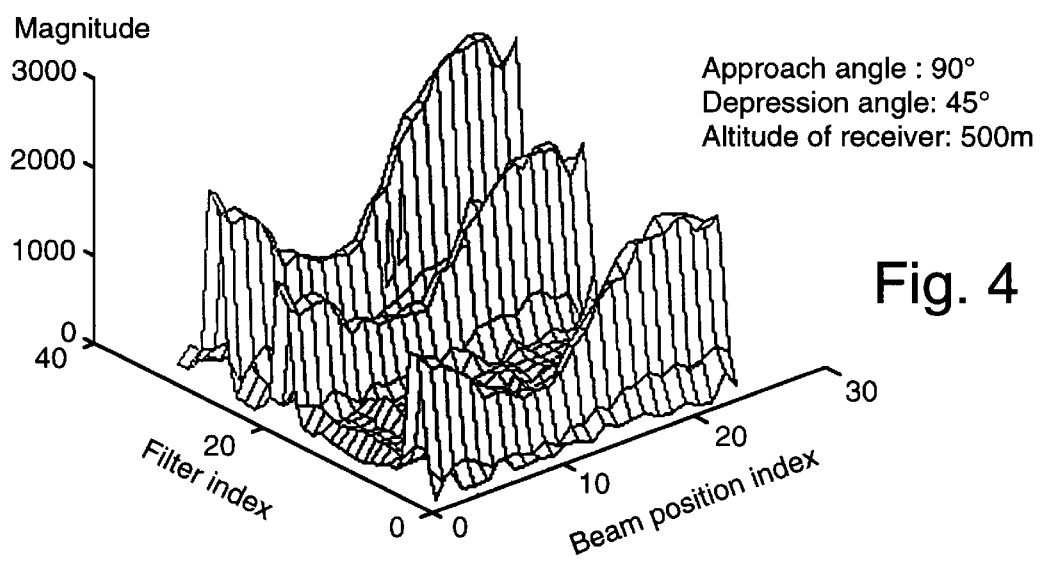
FIG. 4 illustrates exemplary flight test data showing pulse to pulse signal coherence.

FIGS. 3 and 4 show demonstrated successful transmit/receive unlocked synchronization achieved in the flight test and the intrapulse and the interpulse stability, respectively, attained by the radar system 10 using the exemplary waveform 20 in bistatic operation.

FIG. 3 illustrates exemplary flight test data showing intrapulse biphase pulse compression. Results of the flight test show successful pulse compression (30 MHz bandwidth, five meter range resolution). Data processing has verified that the receiver 12 accurately acquires and tracks the peak return range bin (the range of the target 13). The peak range bin remains the same over the complete conical scan performed by the receiver 12. The modulation imposed by the conical scan can be seen on the signal. Test results show negligible PRI drift between the unlocked transmitter 11 and the receiver 12 over a complete conical scan.

FIG. 4 illustrates exemplary flight test data showing pulse to pulse signal coherence. Results of flight test data show excellent spectral stability between the transmitter 11 and the unlocked receiver 12. A 32-point FFT of the AA00AA00 . . . sequence shows the signal in the 30th FFT filter and, as expected, its ambiguities at +/−PRF/4. Data processing results verify that characteristics of the acquired illumination pattern signal are stable over the conical scan. The conical scan modulation over beam positions appear on the signal response. Tracking performance demonstrates that coherence is established over at least the 32 integrated pulses. The signal stays within one Doppler filter. The DC offset indicates the relative offset of the unlocked receiver 12 from the transmitter 11.

Figure 5:
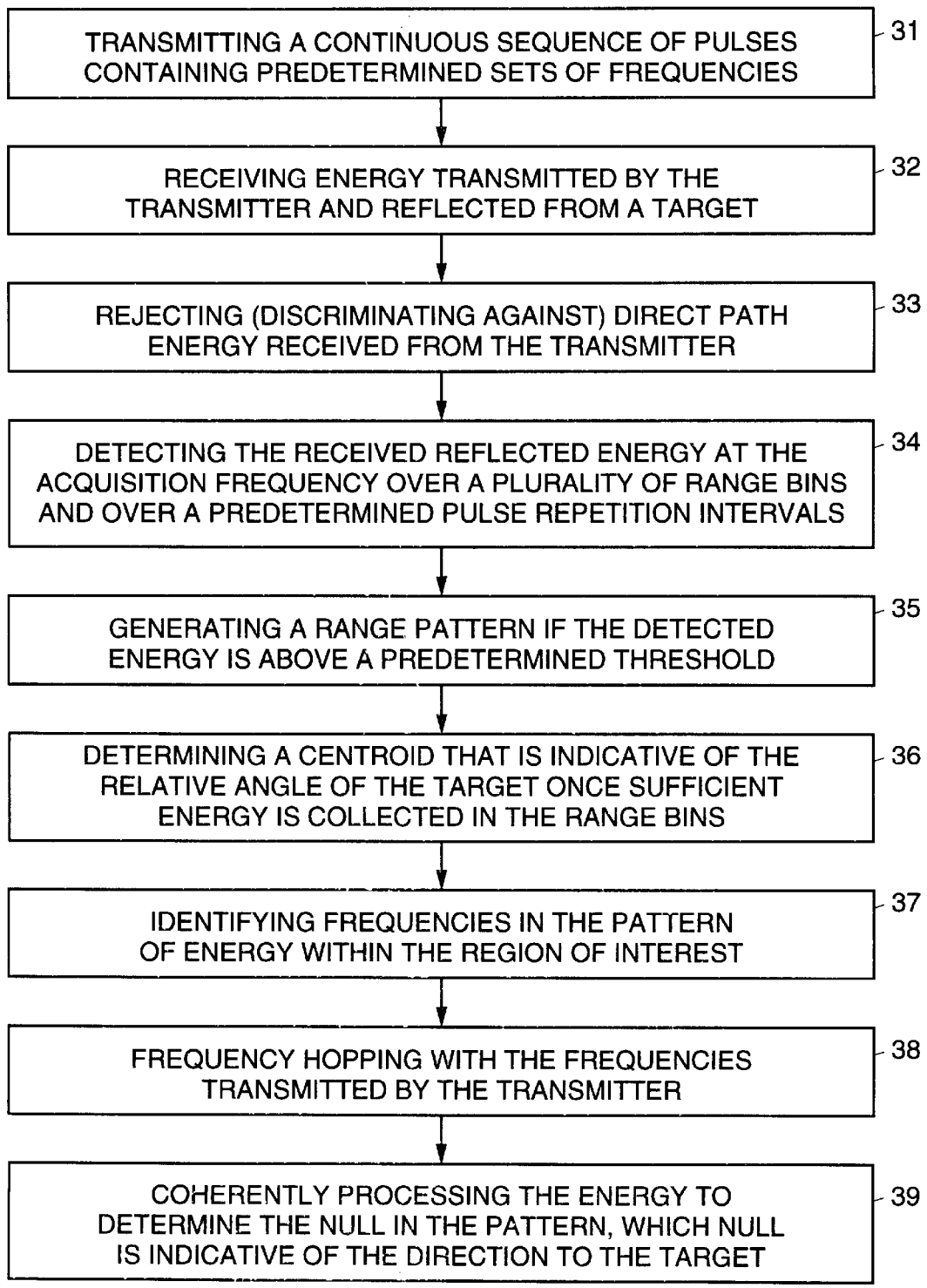
FIG. 5 is a block diagram illustrating an exemplary processing method in accordance with the present invention.

FIG. 5 is a block diagram illustrating an exemplary processing method 30 in accordance with the present invention for detecting a target 13 using an unlocked transmitter 11 and receiver 12 of a bistatic radar system 10. The processing method 30 comprises the following steps.

A continuous sequence of pulses, which may be pulse compressed, is transmitted 31 at predetermined sets of frequencies. One frequency (an acquisition frequency) is transmitted (revisited) more times than the other frequencies to provide for improved acquisition. Energy transmitted by the transmitter 11 and also reflected from a target 13 is received 32. The direct path energy from the transmitter 11 is not required and is rejected 33 (i.e., discriminated against). The received reflected energy is processed to detect 34 energy at the acquisition frequency over a plurality of range bins and over a predetermined pulse repetition intervals. To accomplish this, the processing may include scanning a receive beam in the vicinity of the target 13. If the detected energy is above a predetermined threshold, then this is indicative of a region of interest (or range bins of interest), and a range pattern is generated 35.

Once sufficient energy is collected in the range bins, a centroid is determined 36 that is indicative of the relative angle of the target 13. The pattern of energy within the region of interest is processed to identify 37 all frequencies in the pattern. Thus, the pattern of frequencies is determined. Once the pattern is determined, the receiver 12 then frequency hops 38 with the transmitter 11. The energy is coherently processed 39 using Fourier transforms (FFTs) to determine 39 the pattern center in the pattern. The pattern center is indicative of the direction to the target 13.

Thus, a waveform and processing method that permits low cost coherent and frequency agile bistatic operation of unlocked radar transmitters and receivers have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for detecting a target using an unlocked transmitter and receiver of a bistatic radar system, comprising the steps of:

transmitting a continuous sequence of pulses containing predetermined sets of frequencies;

receiving energy transmitted by the transmitter and reflected from a target;

rejecting direct path energy received from the transmitter;

detecting the received reflected energy at the acquisition frequency over a plurality of range bins and over a predetermined pulse repetition intervals;

generating a range pattern if the detected energy is above a predetermined threshold;

determining a centroid that is indicative of the relative angle of the target once sufficient energy is collected in the range bins;

identifying frequencies in the pattern of energy within the region of interest;

frequency hopping with the frequencies transmitted by the transmitter; and coherently processing the energy to determine the center in the pattern, which pattern center is indicative of the direction to the target.

2. The method of claim 1 wherein the step of transmitting a continuous sequence of pulses comprises transmitting a continuous pulse compressed sequence of pulses.

3. The method of claim 1 wherein an acquisition frequency is transmitted more times than the other frequencies to provide for improved acquisition.

4. The method of claim 1 wherein the step of detecting the received reflected energy comprises the step of scanning a receive beam in a direction toward the target.

5. The method of claim 1 wherein the step of coherently processing the energy comprises the step of coherently processing the energy using Fourier transforms.

6. A bistatic coherent unlocked radar system for tracking a target, comprising:

a transmitter for transmitting a continuous sequence of pulses containing predetermined sets of frequencies; and a receiver that receives energy that is transmitted by the transmitter and that is reflected from target, that rejects direct path energy received from the transmitter, that detects the received reflected energy at the acquisition frequency over a plurality of range bins and over a predetermined pulse repetition intervals, that generates a range pattern if the detected energy is above a predetermined threshold, that determines a centroid that is indicative of the relative angle of the target once sufficient energy is collected in the range bins, that identifies frequencies in the pattern of energy within the region of interest, that frequency hops with the frequencies transmitted by the transmitter, and that coherently processes the energy to determine the center in the pattern, which pattern center is indicative of the direction to the target.

7. The system of claim 6 wherein the transmitter transmits a continuous pulse compressed sequence of pulses.

8. The system of claim 6 wherein the transmitter transmits an acquisition frequency more times than the other frequencies to provide for improved acquisition.

9. The system of claim 6 wherein the receiver detects the received reflected energy by scanning a receive beam in the vicinity of the target.

10. The system of claim 6 wherein the receiver coherently processes the energy using Fourier transforms.

* * * * *